United States Patent [19]

Hodes et al.

[11] 4,309,474
[45] Jan. 5, 1982

[54] STRATIFICATION MASS FOR THE PRODUCTION OF TOP SURFACING LAYERS

[75] Inventors: Erich Hodes, Rosbach; Danilo Sternisa, Emmindingen; Walter Schneider, Wetzlar, all of Fed. Rep. of Germany

[73] Assignee: Glyco-Metall-Werke Daelen & Loos GmbH, Wiesbaden, Fed. Rep. of Germany

[21] Appl. No.: 160,127

[22] Filed: Jun. 16, 1980

[30] Foreign Application Priority Data

Jul. 12, 1979 [DE]  Fed. Rep. of Germany ....... 2928081
Jan. 17, 1980 [DE]  Fed. Rep. of Germany ....... 3001516

[51] Int. Cl.$^3$ .......................... B32B 5/16; B32B 9/00; B32B 15/00
[52] U.S. Cl. .................................... 428/328; 428/422; 308/241; 308/DIG. 8; 308/DIG. 9; 427/190
[58] Field of Search ............... 428/323, 328, 421, 422; 427/190, 195, 203, 205; 260/42.27, 42.49; 75/166 R, 166 D; 308/241, DIG. 7, DIG. 8, DIG. 9; 252/12.12

[56] References Cited

U.S. PATENT DOCUMENTS 3,019,206  1/1962  Robb ........................... 260/42.27 X
3,039,992  6/1962  Smith .......................... 260/42.27 X
3,503,923  3/1970  Petrella et al. ................. 260/42.27
3,772,249 11/1973  Morgans ....................... 260/42.27 X

FOREIGN PATENT DOCUMENTS 2028670 12/1970  Fed. Rep. of Germany ... 260/42.27
1277485  1/1967  France .......................... 308/308 N
926718   5/1963  United Kingdom ......... 308/DIG. 7

OTHER PUBLICATIONS

Woldman, Norman E., "Engineering Alloys" American Society for Metals, 1954, pp. 1029-1030.

*Primary Examiner*—John D. Smith
*Assistant Examiner*—Bernard F. Plantz
*Attorney, Agent, or Firm*—H. Gibner Lehmann; K. Gibner Lehmann

[57] ABSTRACT

A stratification mass for the production of top surfacing layers particularly through dipping, painting, filling or spraying on a carrier (especially for friction/slide layers of bearing laminates having metallic base members) of a matrix foundation substance of fluoride-held polymers which has admixed metal or metal-alloy particles and/or additive material with friction and/or slide-improving characteristics. The applied layer material is subjected to heat to melt the same, and the layer is then cooled and pressed. The synthetic substance of the matrix can contain a primer, such as chromium oxide.

14 Claims, 2 Drawing Figures

STRATIFICATION MASS FOR THE PRODUCTION OF TOP SURFACING LAYERS

BACKGROUND

This invention relates to mass coating to build up top surfacing layers, in particular by dipping, painting-on, filling or spraying a carrier member of any kind, especially for the manufacture of friction and/or slide layers of multi-layer materials having a metallic base member.

Synthetic products, such as PVDF, FEP, PTFE plastics, are all used today in many different fields of industrial manufacture. Many of the best plastics have superior chemical stability, mechanical durability and surface area characteristics, as well as surprising friction value properties.

Also, PTFE, of these synthetics, has another in addition to the above-mentioned superior properties, namely excellent heat resistance. Unfortunately, however, it has the disadvantage of weak joining or sticking together with other substances.

The well-used expression "Polyvinylidenefluoride" relates not only to the normally hard, high-molecular weight homopolymer of vinylidenefluoride, but also to a normally hard copolymer of vinylidenefluoride with an excess of vinylidenefluoride homogeneity. This latter may, for example, be a copolymer with up to 30 Mol. %, as co-monomer tetrafluorethylene, trifluorethylene, vinylfluoride, hexafluorpropylene and other known monomers.

The copolymers have thereby, in relation to the use, essentially the same characteristics as the homopolymers.

The well-used expression "PTFE" relates also to lower-molecular tetrafluorethylenepolymers, which is obtained from pyrolysis of normally-hard, high-molecular PTFE. These PTFE small particles can be produced when unsintered polytetrafluorethylene, which is obtained by polymerization of tetrafluorethylene in an aqueous suspension or dispersion, has received Beta or Gamma X-ray radiation with an intensity between 5 and 50 Mrad to break it down. The molecular weight is reduced, and there is thus obtained a wax-like end product.

The low-friction, abrasion-resistant and temperature-stable bearing materials, whose main components are fluor-carbohydrates such as polyvinylidenefluoride are well known.

An object of the present invention is to provide an improved, low-friction, temperature stable, high abrasion resistant surfaced laminate having a fluor-synthetic layer intermixed with an alloy by which there is produced excellent bonding and friction characteristics through the use of inorganic and/or organic materials incorporated in pulverized or powder form; and a method of producing the same.

This object is attained by the producing, on a substrate, of a matrix layer of fluor-synthetic material which contains fluor-polymers, said matrix containing alloy substances having a density $\geq 8$ g/cm$^3$.

Surprisingly it has been found that a unique transformation or conversion of a carrier material by means of fluor-synthetic, anti-adhesive surfacing in accordance with the invention, can enable it to withstand appreciable dynamic loading in an excellent manner. This transformation embraces the inclusion, in a fluor-synthetic layer applied to the substrate of moving carrier material by a continuous coating method, of anti-friction alloy particles having a density $\geq 8$ g/cm$^3$ and a volume ratio to the top surfacing synthetic layer of between 5% (5/100) and 35% (35/100) preferably from 10% to 25% by volume. The fluor-synthetic has included in its composition a primer material which improves the surface bonding of the fluor-synthetic material to the substrate. The bonding zone is not weakened, and the dynamic load will not result in loosening of the cover layer from the substrate.

Through these seemingly opposite measures the state of the art is considerably advanced, and a simple-to-manufacture top layer strip in particular for the manufacture of friction and slide layers according to the invention is produced by an essentially simpler, economical-to-practice method. Accordingly, the foregoing can be summarized by the statement that it is a general object of the invention to improve a compound laminate of the kind described at the outset, so as to make it low in friction, heat-resistant and highly wear-resistant while at the same time the area bond of the fluor-polymer matrix to the substrate is increased to a degree where subsequent processing steps or phases of the compound laminate in producing the end product, such as friction bearing elements, can take place without weakening the bonding zone and with no expectation of detachment of the working surface layer (which is adhering to the substrate) under dynamic loads.

In an advantageous manner the matrix in reality can be constituted of polyvinylidenefluoride containing, as a deposition if the occasion arises, at least one additive, such as the friction and slide characteristic improving alloy material in powder form with a grain size $\leq 40$ $\mu$m. Likewise in an advantageous manner the additive alloy can be a mixture of two or more materials introduced in powder form, whose density $\geq 8$ g/cm$^3$. In another advantageous execution of the invention the alloy additive can be homogeneous with a density of 8 g/cm$^3$ or else constituted of two or more of the following materials: lead, lead-tin alloy, as lead with 2% tin content, lead oxide or lead sulfide.

In one advantageous execution of the invention the friction and/or slide characteristic improving additive substances can be organic, for instance, lower molecular weight PTFE or inorganic substances such as graphite, molybdenum sulfide and others. Thereby considering the total quantity of the additives, the friction and/or slide characteristic improving materials of the mixture can have a ratio relative to the alloy materials of between 5% and 50% by volume, preferably from 10% to 30% by volume, provided in powder form with a grain size $\leq 40$ $\mu$m.

In an especially advantageous execution of the invention, the top surface layer can consist of the following mentioned elements:
60% by Vol. PVDF
30% by Vol. Pb with 2% Sn
100% of the above particles can have a Grain size $\leq 40$ $\mu$m
10% by Vol. lower-molecular PTFE In a second advantageous execution of the invention, the top surface layer can consist of the following mentioned elements:
55% by Vol. PVDF
25% by Vol. Pb/PbO
100% of the above particles can have a Grain size $\leq 40$ $\mu$m 20% by Vol. PPS/PTFE NM (where PPS indicates polyphenylene sulfide)

In a third advantageous execution of the invention, the top surface layer can consist of the following mentioned elements:

|  | Abrasion | Friction Value |
|---|---|---|
| 60% by Vol. PVDF |  |  |
| 30% by Vol. Pb/PbO having a grain size ≦40 μm |  |  |
| 10% by Vol. PTFE NM |  |  |
| 100% by Vol. PTFE NM as a top cover layer | 6 μm | 45 N |

It has been determined experimentally that by the addition of firmer materials, for example, a chromium oxide, to the matrix a functionally practical organization is achieved between the alloy materials with a density $\geq 8$ g/cm$^3$ and the primer substance, whereby the integrity of the bond between the metallic carrier layer and the top area layer is improved.

Surprisingly it has been found that through the addition of chromium oxide from the group $CR_2O_3$, the surface bond of the fluor-containing polymers to the substrate has been increased especially well, so that in the subsequent transformation of the carrier material by the applied cover area layer to form the slide-bearing element, any danger of loosening of the adhered friction and slide cover layer from the substrate is removed. Advantageously, the primer material can be in a quantity between 0.5% to 5% by weight, based on the entire weight of the matrix.

The manufacture of multiple-layer materials by means of a mass coating in accordance with the invention can be carried out during a continuous passage of the substrate, whereby the method steps can be shown in a particularly advantageous manner as follows: Forming a matrix of a fluoride-containing polymer and alloy material with a density of $\geq 8$ gr/cm$^3$ and 100% of said particles having a grain size $\leq 40$ μm, and if the occasion arises, with an additive friction and/or slide improving material with 100% of the particles having a grain size $\leq 40$ μm all of which are intensively mixed and applied to a prepared surface area of a metallic carrier material in the form of a powder mixture or as a suspension/paste, to a desired thickness, the matrix, in its formation of the top-surfacing layer on the surface area of the metallic carrier material and the embedment of particles of the alloy stock and, if the occasion arises, the additive material are all melted together.

In an advantageous execution of the invention the carrying-surface area of the carrier layer, which mounts the top-surfacing layer, is mechanically roughened before the top-surfacing layer is applied and a rough base of good friction and/or sliding characteristic, which contains metallic substance, is sintered or thermally sprayed on the surface area of the carrier layer before the top-surfacing layer is applied.

In an especially advantageous execution of the invention the following method is had: Applying a solvent to the mixture of the matrix-forming fluorine-containing polymers, alloy materials and if the occasion arises, additive materials to transform them into a suspension; the suspension is applied to the prepared surface of the metallic carrier in any possible, well-known manner; a suitable viscosity in the suspension is chosen, for the setting time of the selected method of application, and while the applying occurs on the surface area of the carrier material, the particles of alloy material are held in balance in the suspension; and the solvent in the applied layer is evaporated under the influence of heat, and the matrix and embedment of alloy particles and additive material are netted together.

According to the invention the viscosity of the suspension is adjusted so that it is suitable for use as a dip bath, in which the carrier material is covered by being dipped and also, the viscosity of the suspension is adjusted so that it is suitable for spraying on the surface to be covered.

In still another execution of the invention the suspension is electrostatically sprayed on the surface of the carrier material, or else, the suspension is air-sprayed on the surface of the carrier material.

In another especially advantageous execution of the invention the carrier material comprises a hollow member, and the top-surfacing layer is correspondingly hollow and adapted to carry a symmetrical body such as a shaft. The method includes the steps of rotating the hollow member about the axis of the hollow, and depositing the suspension on the carrier material under the action of centrifugal force, and adjusting the viscosity of the suspension to enable it to be thrown against the carrier material.

The bearing element can be semi-cylindrical or hollow, as is well understood. The carrier thus can be a hollow bearing half or member. By the present invention a predetermined quantity of the suspension is applied to the hollow of the carrier. The top-surfacing layer is correspondingly hollow and adpated to carry a symmetrical body such as a shaft, the said carrier being warmed and so adapted for the application of the powder mixture at an elevated temperature of, for example, 280° C. The speed of rotation of the carrier material member is substantially synchronized with the rotational speed of the thrown suspension when the application invoves centrifugal force. The carrier material member with the applied top area layer is cooled off by a directed stream, at a cooling station so as to speed-up the fabrication process. Also, the deposited suspension is mechanically cold-compressed against the carrier material member.

For the production of multiple-layer materials by way of mass coating, the following method can be advantageously utilized, including the steps of: Forming a matrix of a fluoride-containing polymer and alloy material with a density of $\geq 8$ gr/cm$^3$ and 100% of the particles thereof having a grain size $\leq 40$ μm, and if the occasion arises, with an additive friction and/or slide improving material with 100% of the particles thereof having a grain size $\leq 40$ μm all of which are intensively mixed and applied to a prepared surface area of a metallic carrier material in the form of a powder mixture or as a suspension/paste, to a desired thickness, the matrix in its formation of the top-surfacing layer on the surface area of the metallic carrier material, and the embedment of particles of the alloy stock and, if the occasion arises, the additive material are melted together.

In connection with the foregoing, a primer material can be added to the matrix, and a solvent utilized to form the mixture into a suspension which is applied in the desired thickness to the metallic carrier material, the solvent in the applied layer being evaporated under the influence of heat, and the matrix and embedment of alloy particles and additive material being all melted together.

According to the invention, the method provided has the advantage that continuous production of the laminate is possible without the necessity for adhesion-promoting intermediate layers of fluor-polymers to be applied to the carrier material, so that without further processing there is here produced a multi-layer slide element which has superior adhesion and wear and friction properties.

The layer thickness of the applied synthetic mixture can be extremely small, for instance, 50 μm. It is possible to apply considerably thicker layers, up to 1 mm without fear that the layer thickness will be outside the allowed tolerance.

Principally, the mass coating can be applied by dipping, painting, filling or spraying onto the metallic carrier, or by sprinkling the powder-like coating material with an adjustable sprinkle beam or by way of electrostatic powder coating. In the field of this discovery, adjustable beam-strewing or sprinkling used in the mass coating according to the invention has proved to be most suitable, because a thick coating of the selected grain size can be uniformly produced without powder loss, and the friction and slide top layer after its passage through the individual heat zones is so uniform that no further methods or steps such as gauging the multiple-layer material of the invention is necessary.

After the applying of the mass coating according to the invention to the carrier material which is in band-like form, it is first melted in an induction oven and then, on conveyors, brought through a furnace enclosure, having adjustable top and bottom heaters.

Another important feature of the invention is that the fusing-on of the mass coating occurs on its underside, whereby the improved mechanism is disposed for release from the fluor-polymer-stratification mass and virtually passes through the alloy material, and elevated static pressure on the adhesion is obtained, with optimal bonding of the fluor-polymer to the carrier strip or workpiece. That is, the melting of the mass coating which forms the layer material first occurs from below, at the surface of the carrier strip or workpiece. Thus the fluoropolymers will have optical adhesion to the surface of the carrier strip or substrate. The additive material having a density $\geq 8$ g/cm$^3$ during the melting process will create a static pressure within the molten mass, such that the molten fluoropolymers are pressed into intimate contact with the binding surface of the substrate. The pressure of the layer material on top of the initial melt is relatively high, since the mixture of the mass coating contains the heavy additive material with the above density, and this high pressure or loading is beneficial for the bond. By means of separate adjustment of the temperature of the top and bottom heaters in the furnace passage there is insured that the continuously-coated carrier material will have a short processing time without stopping, and that complete melting is had of the coating mass-process without dissolving.

Another feature of the invention is the synchronized cooling of the strip-like combined or laminated work material, so as to prevent inner tensions within the slide layer. The controlled cooling process can be accomplished without difficulty in the production process, so that no down-time need be feared, and the strip-like layer material as soon as it is cooled, is wound up into a roll, and without thermal or mechanical after-treatment can be further processed into the usual bearing elements.

A substantial advantage of the invention is that a fluorpolymer work material can be continually produced in a single pass, without requiring that an intermediary layer be applied to the carrier material and without requiring after-treatment.

In the method according to the present invention it is preferred to provide the layered material with a carrier metal of steel, DIN 1624. Quality St. 3 and preferably St. 4.

The question comes up as to other metallic carrier materials, for example, with regard to aluminum, aluminum-plated steel, copper-containing carrier materials. Principally, however, the thickness of the support material, in the preferred execution of the invention, is optionally between 0.2 mm to 2.5 mm.

The to-be-applied, friction-poor layer according to the invention, can be between 50 μm and 1 mm thick, preferably between 80 μm and 200 μm. For attaining extremely low-friction values while retaining excellent wear-out features, the stratification mass of the invention before entering the inductively-heated zone can be a 5 μm to 20 μm thick layer and preferably of 5 μm to 10 μm thickness, with the friction-improving material included. Such friction-improving material can thereby have a grain size, maximum, from 0.1 μm to 5 μm. After the processing in the inductively-heated zone, the stratification mass having the friction-improving alloy according to the invention is pressed into cylindrical pairs. By this method opposed, true stratification masses are produced with a 15% smaller friction value.

The execution possibilities for the manufacture of the layered material according to the invention, as well as the performance of the methods to be used, are described as follows:

EXAMPLE 1

The roughening to be provided on the carrying surface of the metallic carrier layer can be done mechanically, for instance, by blasting, brushing or sledging.

The production of work materials and an exemplary assemblage or laminate are described as follows:
60% by Vol. Polyvinylidenefluoride
30% by Vol. lead with 2% tin
100% the above particles can have a grain size $\leq 40$ μm
10% by Vol. lower-molecular PTFE The mixture process of the components is carried out for 2 hours in a turbulence mixer.

For determining the wear-out rate, the following data has been determined from tests on an abrasion test machine:

| | |
|---|---|
| Sliding speed: | 100 min$^{-1}$ = 0,523 m · s$^{-1}$ |
| static load: | 700 N |
| specific load | 8,9 N/mm$^2$ |
| pV-value: | 4,68 N/mm$^2$ m/s |
| test plates-0: | 10 mm |
| test cylinders-0: | 100 mm |
| hardness of the test cylinder: | 60 HRC |
| test length: | 30 min |
| top surfacing coarseness of the test cylinder: | $R_t$ = 2,84 μm |
| | $R_a$ = 0,24 μm |
| | $R_z$ = 1,78 μm |
| abrasion rate: | 1 μm |

EXAMPLE 2

Another possibility for producing the layering material according to the invention is that, the fluorpolymer polyvinylidenefluoride, through a latent solvent, for example, dimethylformamide (DMF) dissolves, and the alloy material with a specific density $\geq 8$ g/cm$^3$ exhibits, and the slide-property-improving means is stirred in to the dissolved fluorpolymer by means of a fast running stirrer.

Through the amount of the solvent taken up on the part of the fluorpolymer, the viscosity can be so adjusted that the alloy material having a specific density $\geq 8$ g/cm$^3$ shows and is held in balance, and the homogeneity of the mixture as provided by the invention is maintained.

This so-manufactured low-viscosity homogeneous stratification mass can, for instance, be applied by an adjustable sprinkler beam. If for other purposes an extremely thin application is necessary, this can be effected by increasing the amount of latent solvents whereby the viscosity of the stratification mass can be lowered so far that the layers can be produced by dipping or sprinkling by way of an electrostatic or air-spray mechanism or similarly known stratification methods. The high-viscosity stratification mass and also the alloy material are held in balance, in the movement, when fed out of a shuttered container to the spray or similar applicators. The specified layer thickness is from 10 μm to 80 μm, and preferably 20 μm to 40 μm. The used latent solvent is removed out of the stratification mass in a pre-heat zone, so that there results a thin, uniform, pore-free slide layer over the stratification cross section.

The resultant friction wear comes to 1,3 μm wearout, after 30 minutes on the abrasion test mechanism described in the example No. 1, in a uniform order of magnitude.

The composition of the layer work material of example No. 2, is set forth as follows below:
55% by Vol. Polyvinylidenefluoride (PVDF)
25% by Vol. lead-leadoxide/grain size $\leq 40$ μm
20% by Vol. lower-molecular Polytetrafluorethylene The PVDF was dissolved in the DMF and mixed together with the other ingredients in a fast stirrer.

After, the viscosity of the stratification mass was adjusted with DMF to 36 Engler-seconds outflow time.

EXAMPLE 3

Another method according to the invention is the catapulting or slinging of the stratification mass of the invention in a centrifugal rotatably symmetrical vessel.

The stratification mass is a mixture of 65% by volume Polyvinylidenefluoride (PVDF), 25% by volume lead/leadoxide/lead sulfide having a grain size $\leq 40$ μm and 10% by volume of low-molecular polytetrafluorethylene.

The PVDF is dissolved in a latent solvent, and transferred to a fast-running stirrer with other ingredients. The resultant mix is adjusted to give a discharge or outflow time of between 60 and 30 Engler-seconds, as most suitable for catapulting in a centrifugal vessel which is rotated.

For producing the stratification mass the rotation mechanism for the vessel was adjusted at a temperature of 280° C. and a definite amount of the stratification mass in powder form as provided by the invention was filled into the opening of the centrifuge vessel. The heated bearing body to be coated is placed in the vessel for rotation, and the inner surface thereof is uniformly coated by means of the rotation. It is of advantage that where the inner diametric measurement of the body being centrifuged is 300 mm, for example, a rotation of 55 to 60 revolutions per minute is used, because by this circumferential speed of about 56 r.p.m. no de-mixing of the alloy material added to the fluorpolymer-carrier material layer occurs, so that a superior bond is effected, under the precaution of controlled cooling-off of the layer material, that is, the fluoropolymer and carrier material.

BRIEF DESCRIPTION OF THE DRAWINGS

Examples of the layer material according to the invention are given in the accompanying drawing, taken with the following description, wherein.

DETAILED DESCRIPTION OF THE DRAWINGS

Figure 1:
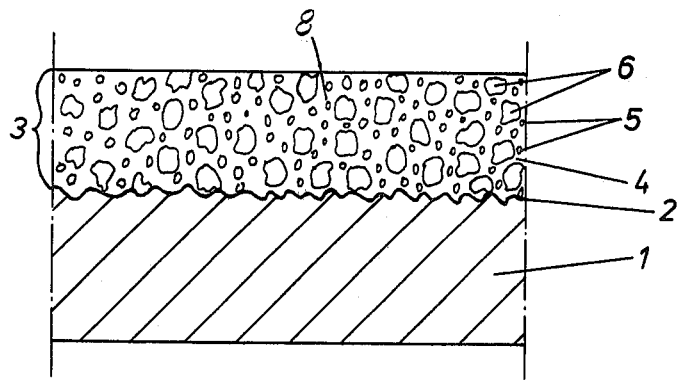
FIG. 1 shows an enlarged section through layer material illustrating an embodiment of the invention; the section could be taken through a semi-cylindrical bearing half (not shown) for example.

From FIG. 1 it is seen that on the to-be-coated, mechanically-roughened carrier surface 2 of a carrier layer 1 of steel DIN 1624, quality St. No. 4, a slide layer, as for instance a friction layer 3 is produced, shown as a matrix 4 of polyvinylidenefluoride. In the matrix 4 are finely-divided, dispersed PTFE particles 5. The maximum diameter of these PTFE particles can be from 0.1 μm to 5 μm. Also there is embedded in the matrix 4 an alloy material 6, of a density $\geq 8$ g/cm$^3$ with a grain size $\leq 40$ μm. Additionally, there is a primer material 8 embedded in the matrix 4 which with the alloy material 6 functions in such a way as to work together, whereby the bond between the metallic carrier layer and the top area layer is substantially improved. The thickness of the friction and/or slide layer amounts to about 200 μm. The thickness of the carrier material 1 can be optionally chosen. If the layer material to be produced is used in a slide situation such as an insert for pumps or shock absorbers, then the thickness of the carrier material 1 can lie between 0.2 mm and 2.5 mm.

Figure 2:
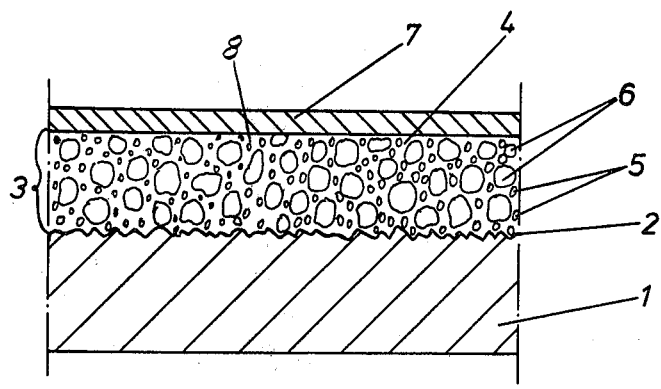
FIG. 2 is an enlarged section through layer material of a second embodiment of the invention.

FIG. 2 differentiates itself from the layer material of FIG. 1 only by the slide-characteristic-improving organic or inorganic material 5 in the matrix 4 and the alloy material 6 which together with the polyvinylidenefluoride produce the slide and/or friction layer. On the slide and/or friction layer there is additionally applied a further, slide-characteristic-improving layer 7 which is partly applied on the contrarotator in order to effect an opposite, approximately 15% improved friction value of the slide and/or friction layer. This additional slide characteristic-improving layer 7 can be from 5 μm to 20 μm thick and consist of a powder which has a grain size of from 0.1 μm to 5 μm. In this case, low-molecular PTFE with a grain size of from 1 μm to 5 μm was used.

Comparison tests:

There were prepared tests between slide bearings which had the stratification mass as provided by the invention as well as those which had the invention stratification mass but with a slide-characteristic improved top layer, opposite a stratification carried out without alloys.

Substantially improved wear-out features were achieved on a pin-cylinder abrasion test mechanism.

Also, there was found to be a considerably lower friction value with the stratification mass of the invention, on a piston-shaft system.

The friction value is measured with a side load of 900 N.

|  | abrasion | friction value |
|---|---|---|
| (1) 60% by Vol. PVDF<br>30% by Vol. Pb with 2% Sn<br>100% of the above particles can have a grain size ≦ 40 μm<br>10% by Vol. low-molecular PTFE NM | 1 μm | 105 N |
| (2) 55% by Vol. PVDF<br>25% by Vol. PB/PbO<br>100% of the above particles can have a grain size ≦ 40 μm<br>20% by Vol. PPS/PTFE NM | 1,5 μm | 98 N |
| (3) 100% by Vol. PVDF | 65 μm | 155 N |
| (4) 60% by Vol. PVDF<br>30% by Vol. Pb/PbO ≦ 40 μm<br>10% by Vol. PTFE NM<br>100% by Vol. PTFE NM Cover layer | 6 μm | 45 N |

Applicants hereby claim priority under 35 USC 119 of German Application No. P 29 28 081.7 filed July 12, 1979, and German Application No. P 30 01 516.8 filed Jan. 17, 1980.

We claim:

1. An anti-friction component for use in connection with sliding surfaces including:
   (a) a working surface layer having anti-friction and/or friction characteristics,
   (b) said component further comprising a carrier member having a metallic bonding surface to which the said working surface layer is bonded,
   (c) said working surface layer comprising in combination a matrix constituted of polyvinylidene fluoride (PVDF) and lead-containing-particles imbedded in the said matrix, said lead-containing-particles having a size ≦40 μm and being provided in a ratio of volume of between 5% and 35% with respect to the volume of the said working surface layer.

2. An anti-friction component according to claim 1, wherein the lead-containing-particles are provided in a ratio of volume of between 10% and 25% with respect to the volume of the said working surface layer.

3. An anti-friction component according to claim 1 wherein the said lead-containing-particles consist of a lead-tin-alloy having 2% tin content.

4. An anti-friction component according to claim 1 wherein the said matrix has deposited in it in addition to the said lead-containing-particles at least one additive material having friction and/or slide improving characteristics, said additive material having friction and/or slide improving characteristics, said additive material being in pulverized form, having a grain size of about ≦40 μm.

5. An anti-friction component according to claim 4 wherein the friction- and/or slide-improving materials are organic.

6. An anti-friction component according to claim 5 wherein the said organic material comprises low-molecular PTFE.

7. An anti-friction component according to claim 4 wherein the said friction- and/or slide improving materials are inorganic.

8. An anti-friction component according to claim 7 in which the said inorganic materials comprise one or more from the group consisting of graphite and molybdenum sulfide.

9. A anti-friction component according to claim 4 wherein the entire amount of the said additive material having friction- and/or slide-improving characteristics is in a ratio of between 5% and 50% by volume with respect to the said lead-containing-particles.

10. An anti-friction component according to claim 4 wherein the said working surface layer consisting of the said matrix and the said lead-containing particles and the said additive material comprises:
    60% by Vol. PVDF
    30% by Vol. Pb-Sn-alloy with 2% Sn content, and a grain size ≦40 μm
    10% by Vol. low-molecular PTFE.

11. An anti-friction component according to claim 4 wherein the said working surface layer consisting of the said matrix and the said lead-containing particles and the said additive material comprises:
    55% by Vol. PVDF
    25% by Vol. Pb-PbO-mixture having a grain size ≦40 μm
    20% by Vol. mixture of polyphenylene sulphide (PPS) and
    low-molecular PTFE.

12. An anti-friction component according to claim 4 wherein the said working surface layer consisting of the said matrix and the said lead-containing particles and the said additive material comprises:
    60% by Vol. PVDF
    30% by Vol. Pb/PbU-mixture having a grain size ≦40 μm
    10% by Vol. low-molecular PTFE and
    said working surface layer being covered by an additional slide characteristic-improving layer having a thickness between 5 μm and 20 μm and consisting of low molecular PTFE powder having a grain size from 0.1 μm to 5 μm.

13. An anti-friction component according to claim 1 wherein the said matrix in addition to the said lead-containing-particles includes a primer material in an amount of between 0.5% and 5% by weight of the said matrix.

14. An anti-friction component according to claim 13 wherein the said primer material comprises chromium oxide.

* * * * *